United States Patent [19]

Muroyama

[11] Patent Number: 4,763,213
[45] Date of Patent: Aug. 9, 1988

[54] DOUBLE-SIDED FLOPPY DISK DRIVING APPARATUS HAVING A MECHANISM FOR PREVENTING HEADS FROM COMING INTO CONTACT WITH EACH OTHER

[75] Inventor: Seiichi Muroyama, Fuji, Japan

[73] Assignee: Kabushiki Kaisha Toshiba, Kawaski, Japan

[21] Appl. No.: 901,521

[22] Filed: Aug. 28, 1986

[30] Foreign Application Priority Data

Aug. 30, 1985 [JP] Japan .................................. 60-191547

[51] Int. Cl.[4] ...................... G11B 21/22; G11B 21/12; G11B 17/03
[52] U.S. Cl. ........................................ 360/105; 360/99
[58] Field of Search ................... 360/105, 99

[56] References Cited

U.S. PATENT DOCUMENTS

| 4,360,844 | 11/1982 | Maiers | 360/105 |
| 4,630,154 | 12/1986 | Shiraishi et al. | 360/105 |
| 4,636,896 | 1/1987 | Takikawa | 360/105 |

OTHER PUBLICATIONS

Japanese Utility Model Application No. 57-140091 (Utility Model Disclosure No. 59-45774).

Primary Examiner—Robert S. Tupper
Attorney, Agent, or Firm—Finnegan, Henderson, Farabow, Garrett & Dunner

[57] ABSTRACT

A double-sided floppy disk driving apparatus having a clamping mechanism provided with a manually-operated lever for moving a clamper pressure plate down, thereby lowering a clamper and clamping a medium, and a mechanism interlinked with said clamping mechanism for moving read/write heads close to each other. The apparatus has a paddle plate having an arm at one end thereof and an opener at the other end thereof. The arm of the paddle plate is pushed down by the clamper pressure plate for pushing down said clamper in order to move said read/write heads close to each other. The apparatus further comprises a head mutual contact-prevention mechanism provided in the vicinity of said paddle plate. The mechanism has a member which is moved to a position under said paddle plate when a medium is not loaded, and which abuts against a loaded medium, is actuated thereupon, and is released from under said saddle plate.

11 Claims, 4 Drawing Sheets

DOUBLE-SIDED FLOPPY DISK DRIVING APPARATUS HAVING A MECHANISM FOR PREVENTING HEADS FROM COMING INTO CONTACT WITH EACH OTHER

BACKGROUND OF THE INVENTION

The present invention relates to a double-sided floppy disk driving apparatus and, more particularly, to a floppy disk driving apparatus which has a mechanism for preventing two heads from coming into contact with each other when a recording medium is not loaded.

Conventional double-sided floppy disk driving apparatuses comprise a head load actuator for moving a pair of heads toward each other. Such a head load actuator is driven by a solenoid or the like. The heads are actuated and urged, using a predetermined pressure, against the two surfaces of a medium only when the medium is loaded correctly.

Recently, double-sided floppy disk driving apparatuses became available, in which the head load actuator is omitted. An apparatus of this type is mechanically interlinked with a mechanism for clamping the medium, so that its heads are moved toward each other.

An example of such a floppy disk driving apparatus will be now described with reference to FIGS. 1 to 3. The apparatus comprises a medium-clamping mechanism. The clamping mechanism has manually operated lever 1 to which cam 2 is connected. When lever 1 is pivoted, cam 2 is pivoted therewith, thereby pushing down swing arm 3. Arm 3 pushes down clamper pressure plate 4 and hence clamper 6. A medium is thus clamped between clamper 6 and a spindle (not shown). Clamper 6 is guided by clamper guide 5 so as to be vertically movable.

The apparatus also has a carriage mechanism. The carriage mechanism has carriage 7, which is guided in the radial direction of a medium by guide rail 8 and guide pin 11. Steel belt 9 is mounted on carriage 7. An intermediate portion of steel belt 9 is wound around pulley 10. Pulley 10 is mounted on the rotating shaft of stepping motor 14. When stepping motor 14 is activated, its rotation is converted into a linear movement by pulley 10 and steel belt 9, thereby reciprocating carriage 7 linearly. S0 head 13 for side 0 of the medium and S1 head 12 for side 1 of the medium are attached to carriage 7. S1 head 12 is biased downward by a spring (not shown), so as to move toward S0 head 13.

A paddle mechanism is provided on the side of the carriage and clamp mechanisms. The paddle mechanism comprises paddle plate 16, an end portion of which is mounted on a base plate, so as to be vertically pivotal. The base plate supports the mechanical portion of the floppy disk driving mechanism. Arm 16a and opener 17 are located on paddle plate 16. The distal end portion of arm 16a is located under the distal end portion of pressure plate 4 of the clamp mechanism. Opener 17 is located under head arm 15 provided on S1 head 12 of the carriage mechanism. Paddle plate 16 is biased to pivot upward by means a spring (not shown). When a medium is not clamped, opener 17 of paddle plate 16 pushes head arm 15 upward, and separates S1 head 12 from so head 13, as shown in FIG. 2. When clamper 6 is pushed down to clamp the medium, the distal end portion of pressure plate 4 pushes down arm 16a, thereby pivoting paddle plate 16 downward. Thus, opener 17 is moved downward in synchronism with downward pivot of paddle plate 16 and is separated from head arm 15. Head 12 is moved downward by the biasing force of the spring and clamps the medium together with head 13. Thus, heads 12 and 13 are abutted against the two sides of the medium, and read data out from or write data in the medium.

In the floppy disk driving apparatus having the above arrangement, assume that lever 1 is operated when no medium is loaded in the apparatus, and that the clamp mechanism is set in the clamping state. Then, as described above, since paddle plate 16 is pivoted downward to remove opener 17 from head arm 15, head 12 is moved downward by the biasing force of the spring and directly contacts head 13, as shown in FIG. 3. When the heads are brought into direct contact with each other, they are damaged. In addition, since the head surfaces are polished to a high smoothness, they provide a suction effect and the heads cannot be separated.

It is, therefore, an object of the present invention to provide a floppy disk driving apparatus wherein, when a medium is not loaded in the correct position, the heads are not brought into direct contact with each other, even if the clamp mechanism is set in a clamping state.

It is another object of the present invention to provide a floppy disk driving apparatus which has a mechanism for preventing direct contact between its heads, which has high operational reliability and a simple arrangement.

SUMMARY OF THE INVENTION

The present invention has a head mutual contact-prevention mechanism which is disengaged only when a loaded medium abuts against it. When a medium is not loaded, the head mutual contact-prevention mechanism prohibits the paddle plate from pivoting downward and, when a medium is loaded, it allows the paddle plate to pivot downward. The arm provided on the paddle plate and extending to a portion below the distal end portion of the clamper pressure plate is made of a leaf spring having elasticity. When the paddle plate is prohibited by the head mutual contact-prevention mechanism from pivoting downward, if the clamper pressure plate is moved downward, the leaf spring is elastically deformed in order to prevent overloading of the respective components of the mechanism.

According to an embodiment of the present invention, the head mutual contact-prevention mechanism also serves as an eject mechanism. When a medium is loaded in the correct position, the eject mechanism imparts a clicking sound, when the medium is released, it ejects the medium.

According to another embodiment of the present invention, the head mutual contact-prevention mechanism is actuated when it is abutted against the side portion of the loaded medium, and cancels the downward pivot-prohibition of the paddle plate.

BRIEF DESCRIPTION OF THE DRAWINGS

The present invention will be clearly understood by referring to the description of the embodiments with reference to the accompanying drawings, in which.

DETAILED DESCRIPTION OF THE EMBODIMENTS

Figure 1:
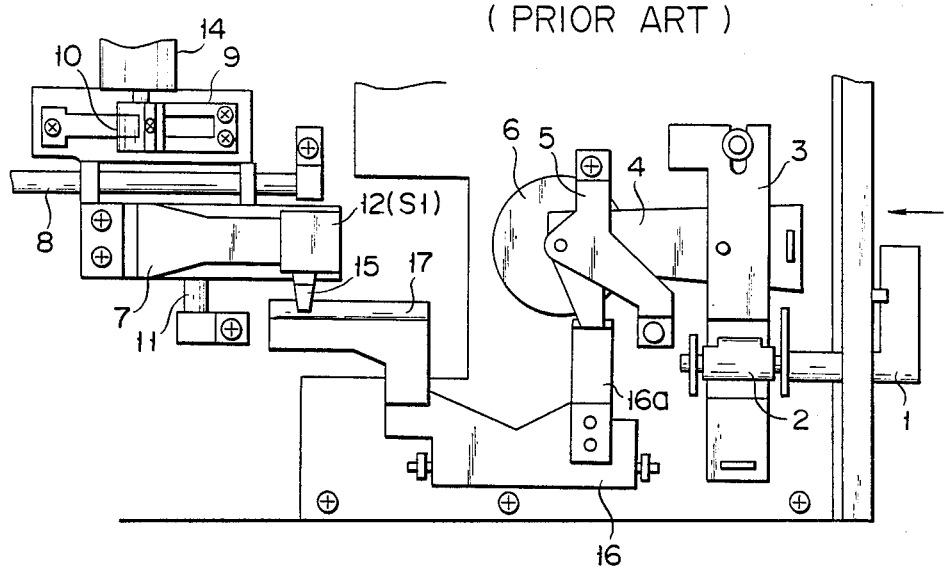
FIG. 1 is a partial plan view of a conventional double-sided floppy disk driving apparatus.
Figure 2:
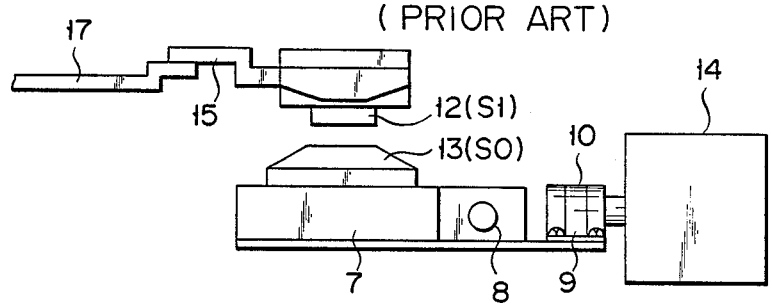
FIG. 2 is a partial side view of the apparatus shown in FIG. 1 wherein heads are separated from each other.
Figure 3:
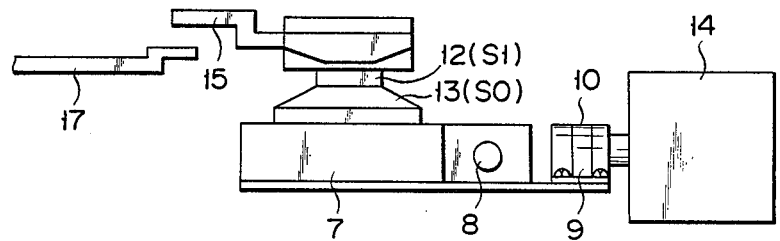
FIG. 3 is a partial side view of the apparatus shown in FIG. 1 wherein heads are in direct contact with each other.

FIGS. 4 to 7 show a first embodiment of the present invention. In the first embodiment, an eject mechanism for ejecting a medium when the medium is released, serves also as a head mutual contact-prevention mechanism.

The apparatus has a medium-clamping mechanism. The clamping mechanism has manually operated lever 1 to which cam 2 is connected. When lever 1 is pivoted, cam 2 is pivoted therewith and pushes down swing arm 3. Note that spring 30 serves to return lever 1 to its original position. Swing arm 3 pushes down clamper pressure plate 4 in turn, together with clamper 6 (which is connected to clamper pressrue plate 4), so that the medium is clamped between clamper 6 and spindle 32. Clamper 6 is guided by guide pin 31 extending downward from clamper guide 5, so as to be vertically movable.

The apparatus also has a carriage mechanism. The carriage mechanism has carriage 7 which is guided by guide rail 8 and guide pin 11, so as to be movable in the radial direction of the medium. Steel belt 9 is mounted on carriage 7. An intermediate portion of belt 9 is wound around pulley 10. Pulley 10 is mounted on the rotating shaft of stepping motor 14. When motor 14 is activated, its rotation is converted into a linear movement by pulley 10 and belt 9, thereby reciprocating carriage 7 linearly. S0 head 13 for side 0 of the medium and S1 head 12 for side 1 of the medium are mounted on carriage 7. S1 head 12 is biased downward by a spring (not shown), so as to come close to S0 head 13.

A paddle mechanism is provided on the side of the carriage and clamping mechanism. The paddle mechanism has paddle plate 16, an end of which is pivotally mounted on a base plate 38 supporting the mechanical portion of the floppy disk driving mechanism. Arm 20 and opener 17 are located on paddle plate 16. Arm 20 is made of an elastically deformable leaf spring. The distal end portion of arm 20 is located under the distal end portion of clamper pressure plate 4 of the clamp mechanism. Opener 17 is located under head arm 15 provided on S1 head 12 of the carriage mechanism. Paddle plate 16 is biased by leaf spring 33, so as to pivot upward. When a medium is not being clamped, opener 17 extending from plate 16 pushes head arm 15 upward and separates S1 head 12 from S0 head 13. When clamper 6 is pushed down to clamp the medium, the distal end portion of plate 4 pushes down arm 20 and pivots paddle plate 16 downward. Accordingly, opener 17 is also moved downward synchronously and is separated from head arm 15. S1 head 12 is moved downward by the biasing force of the spring and clamps the medium together with S0 head 13. As a result, heads 12 and 13 are abutted against the two sides of the medium, to read out data recorded in the medium or write data in the medium.

Head mutual contact-prevention mechanism 40 is provided in the vicinity of the end portion of paddle plate 16 and the side portion of carriage 7. Mechanism 40 also serves as the eject mechanism for ejecting the medium when the clamping force is cancelled. Mechanism 40 has paddle stopper plate 21, which is pivotally mounted on base plate 38 by means of pin 22. Base plate 38 supports the eject and head mutual contact-prevention mechanism. Coil spring 23 is mounted on pin 22 in order to bias paddle stopper plate 21, thereby pivoting plate 21 clockwise. Stopper 24 is mounted on base plate 38. Medium-abutting portion 34 is located on plate 21. When a medium 25 is loaded, its front end is abutted against portion 34, and plate 21 is pivoted counterclockwise against the biasing force of spring 23. Plate 21 is urged against base plate 38 by spring 23. Projecting ridge 37 is formed on the upper surface of plate 38. In the state shown in FIG. 4, plate 21 has climbed over ridge 37. Leaf spring piece 35 is mounted on plate 21. The distal end of piece 35 is elastically deformable in the horizontal direction. Triangular projection 36 is formed on one end of opener 17.

Figure 4:
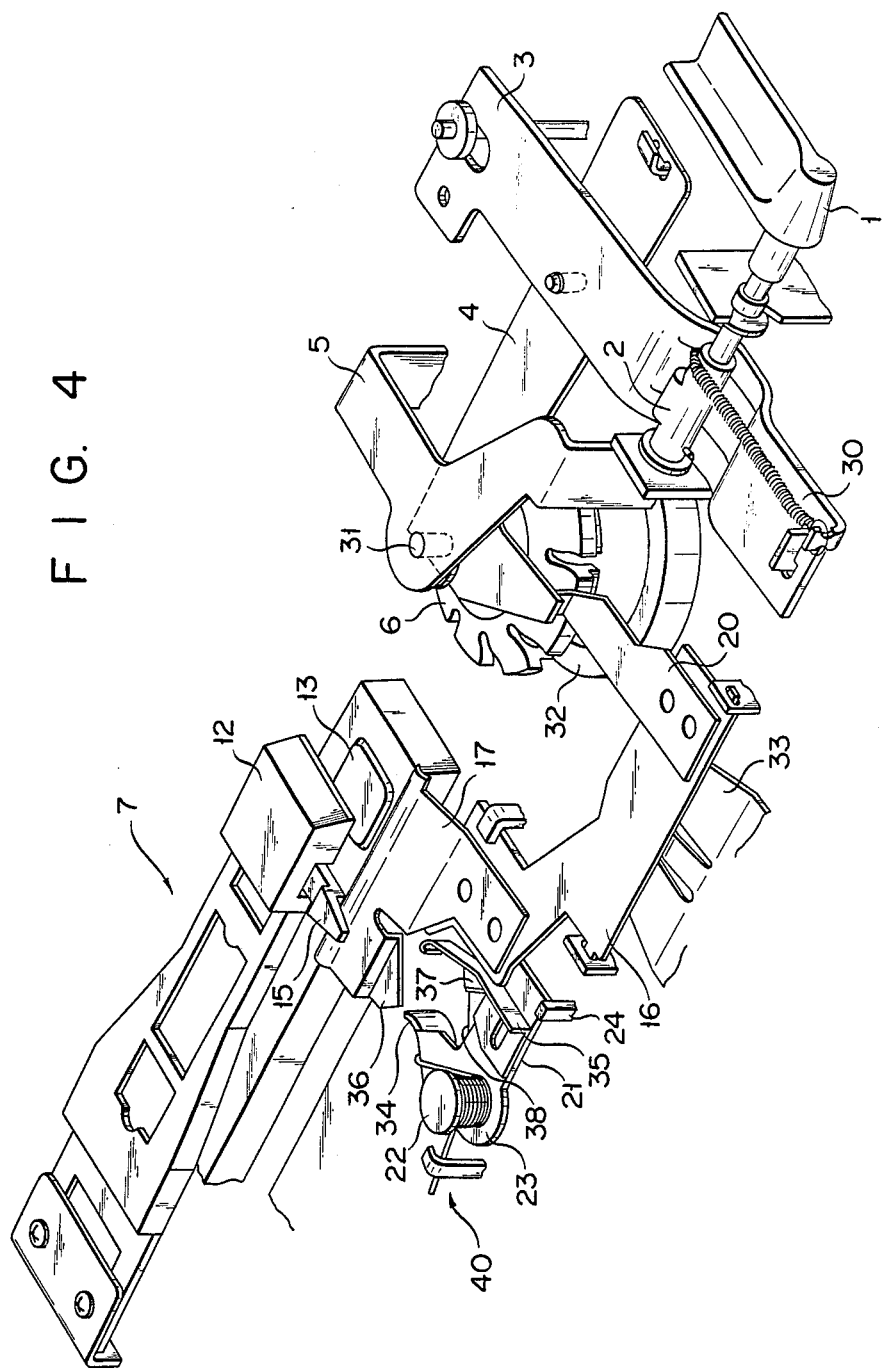
FIG. 4 is a perspective view of a main part of the apparatus according to a first embodiment of the present invention.
Figure 5:
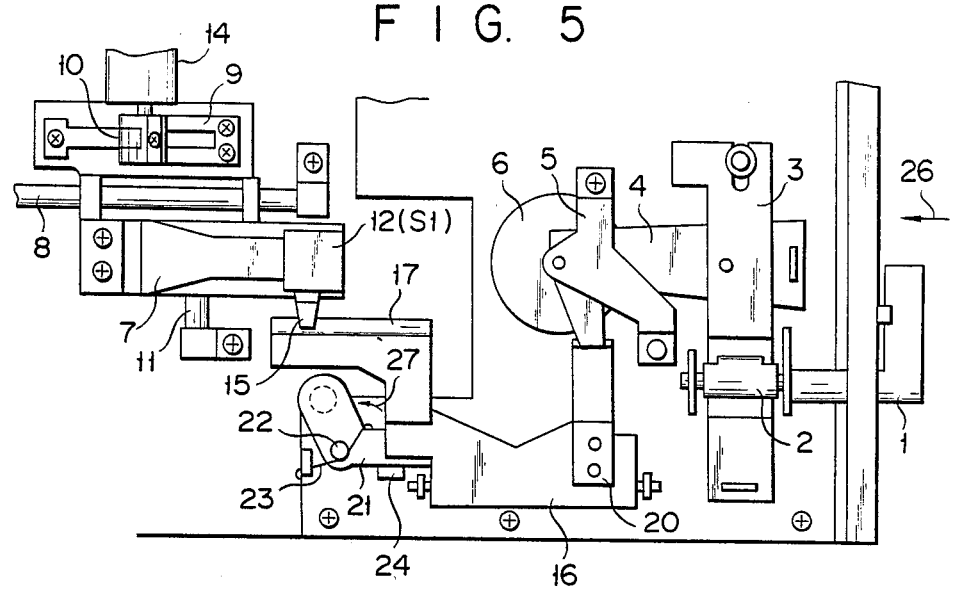
FIG. 5 is a plan view of a main part of the apparatus shown in FIG. 4.
Figure 6:
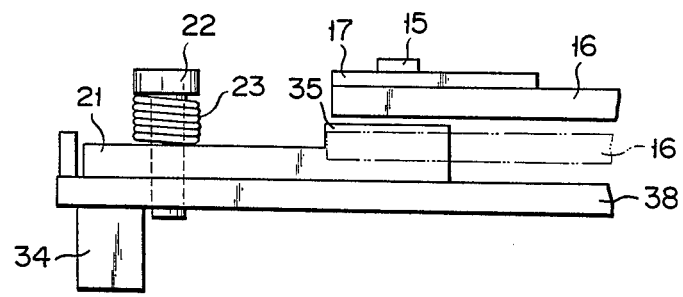
FIG. 6 is a partial side view of the apparatus shown in FIG. 4 wherein its head mutual contact-prevention mechanism prohibits the paddle plate from pivoting downward.
Figure 7:
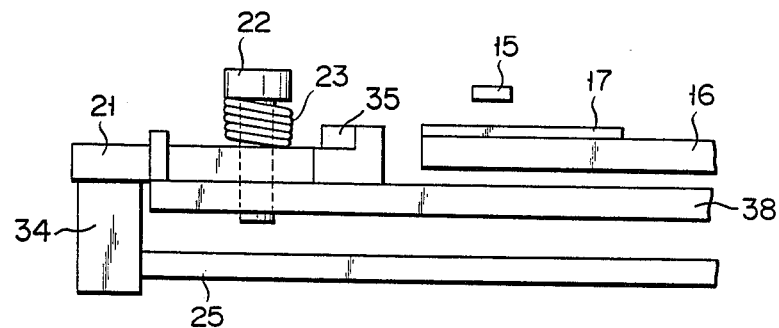
FIG. 7 is a partial side view of the apparatus shown in FIG. 4 wherein the head mutual contact-prevention mechanism cancels downward pivotal movement of the paddle plate.

In the state shown in FIGS. 4 to 6, the distal end portion of plate 21 is located under paddle plate 16 to prohibit it from pivoting downward. When plate 21 is urged at this position by the medium 25 and is pivoted counterclockwise through about 45°, the distal end of plate 21 is released from under plate 16, so that plate 16 can pivot downward, as shown in FIG. 7.

The operation of this embodiment will now be described. First, a medium is loaded through an insertion port in the state shown in FIG. 4, i.e., in the state wherein the clamp mechanism is in the release mode. The leading edge of the loaded medium is abutted against medium abutting portion 34 of plate 21, and pivots plate 21 counterclockwise against the biasing force of spring 23. When the trailing edge of plate 21 reaches the distal end of projecting ridge 37, it is pushed downward by the axial biasing force of spring 23, so as to move close to base plate 38, and the trailing end of plate 21 is locked by the distal end of ridge 37. As a result, the insertion resistance toward the medium, caused by spring 23, ceases abruptly at this point, and a clicking sound is produced, so that the user can confirm that the medium is loaded in the correct position. Then, plate 21 is released from under plate 16, so that plate 16 can pivot downward. In this case, the distal end of leaf spring piece 35 is abutted against the distal end of projection 36 of opener 17, and is bent.

Subsequently, lever 1 is pivoted downward through about 90°. Then, swing arm 3 is pushed down by cam 2 coupled to lever 1. Plate 4 is pushed down, and clamper 6 is moved downward, in order to clamp the medium together with spindle 32. Clamper plate 4 pushes down arm 20 of plate 16, so that plate 16 is pivoted downward. Since opener 17 is moved downward together with plate 16 and is separated from head arm 15, S1 head 12 is moved by the biasing force of the spring, to approach S0 head 13. Heads 12 and 13 are thus abutted against the two sides of the medium. Under this condition, the read/write operation is executed. In this case, since opener 17 is moved downward, the distal end portion of projection 36 of opener 17 is released from the lower end of the distal end portion of leaf spring piece 35. The distal end portion of piece 35 is moved forward by its elasticity, and climbs over projection 36.

When the medium is to be ejected, lever 1 is pivoted upward through about 90°. This releases the medium. Also, plate 16 is pivoted upward by spring 33, and moves S1 head 12 upward via opener 17 and head arm 15, so that heads 12 and 13 are separated from the surfaces of the medium. In this case, projection 36 of opener 17 in its upward movement, pushes up the lower end of piece 35, and moves plate 21 upward. Therefore, the trailing end of plate 21 and the rear end of projecting ridge 37 are disengaged from each other, and plate 21 is returned to the initial position in contact with stopper 24 by the biasing force of spring 23. At this time, abutting portion 34 of plate 21 pushes the medium in the unloading direction and ejects the medium. Then, the distal end portion of plate 21 is located under plate 16 again, so as to prohibit the downward pivoting of plate 16.

In this medium-unloaded state, even if lever 1 is pivoted downward through about 90° to perform clamping, since the distal end portion of plate 21 is located under plate 16 to prohibit its downward pivot, as described above, opener 17 is not moved downward. Therefore, S1 head 12 is not moved downward, thereby preventing direct contact between heads 12 and 13. In this case, arm 20 is pushed down by the distal end portion of clamper pressure plate 4. Since arm 20 is made of a leaf spring, it is elastically bent, thereby preventing overloading of the respective components of the mechanisms.

Figure 8:
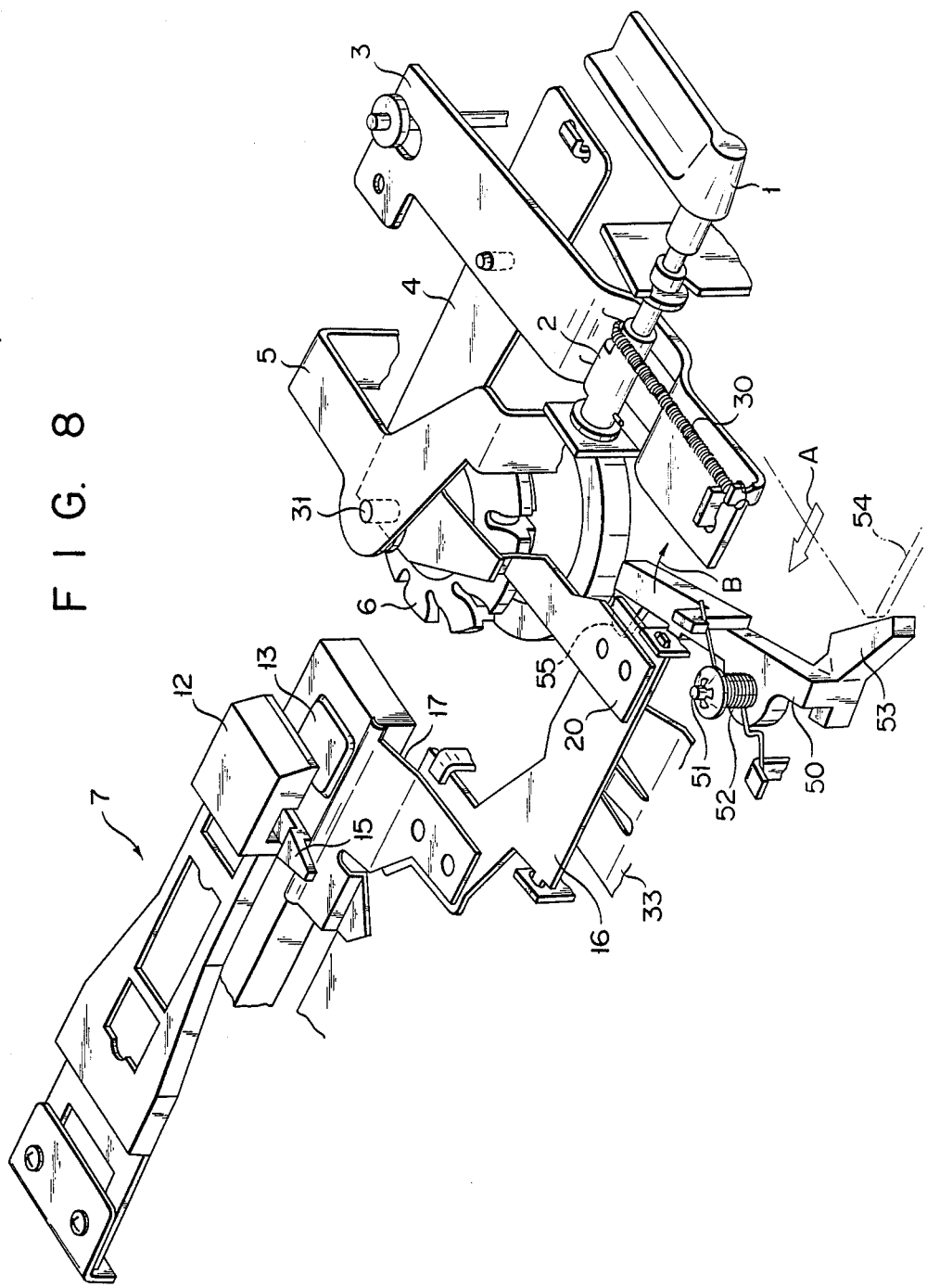
FIG. 8 is a perspective view of the main part of a second embodiment of the present invention.

FIG. 8 shows a second embodiment of the present invention. In the second embodiment, paddle-stopper arm 50 is provided in the vicinity of the end portion of plate 16. Arm 50 is supported by pin 51, so as to be pivotal in a horizontal plane, and is biased by coil spring 52, so as to pivot counterclockwise. Inclined abutting portion 53 is formed on one end portion of arm 50. The side portion of medium 54, loaded in the direction of arrow A, is abutted against portion 53, and pivots arm 50 in the direction of arrow B against the biasing force of spring 52. Stopper portion 55 is located on the other end of arm 50. In the state shown in FIG. 8, i.e., in the state wherein medium 54 is not loaded, stopper portion 55 is moved to a position under plate 16, in order to prevent plate 16 from pivoting downward. When medium 54 is loaded and arm 50 is pivoted in the direction of arrow B, stopper portion 55 is released from under plate 16, so that plate 16 can pivot downward. It must be noted that, except for the above point, the second embodiment has the same arrangement as the first embodiment, and the same reference numerals in FIG. 8 denote the same parts as in the first embodiment.

The present invention is not limited to the above embodiments. It is apparent that various changes and modifications may be made by a person skilled in the art, within the range of the spirit and scope of the invention.

What is claimed is:

1. A double-side floppy disk driving apparatus, for reading data from and/or writing data with a pair of heads on both sides of a medium inserted wherein, comprising:

head supporting means for supporting each head on each side of the medium in a read/write operation, said head supporting means including arm means for supporting one of the heads, said one head supported by said arm means being movable toward and away from the medium with said arm means;

rotating means for rotating the medium inserted into the disk driving apparatus;

clamping means for clamping the medium inserted into the disk driving apparatus on said rotating means, said clamping means being movable toward and away from said rotating means and moving toward said rotating means when clamping the medium;

lifting means for lifting said arm means such that said one head on said arm means moves away from the medium and the other head and for holding said arm means in a lifted position, said lifting means also moving said one head on said arm means into contact with one side of the medium together with movement of said clamping means toward said rotating means when clamping the medium; and head mutual contact-prevention means for holding said lifting means to prevent said one head on said arm means from moving toward the other head with the arm means when said clamping means moves toward said rotating means at times when no medium is inserted into the disk driving apparatus, said head mutual contact-prevention means being released from said lifting means by contacting with the edge of the inserted medium.

2. The disk driving apparatus according to claim 1, wherein said head mutual contact-prevention means further includes stopper means for contacting and holding said lifting means to prevent said one head on said arm means from moving toward the other head as said clamping means moves towards said rotating means at times when no medium is inserted in the disk driving apparatus, said stopper means being released from said lifting means by the edge of the medium at times when the medium is inserted in the disk driving apparatus.

3. The disk driving apparatus according to claim 2, wherein said head mutual contact-prevention means further includes return spring means for urging said stopper means towards said lifting means, the edge of the medium pushes the stopper against the urging force of said return spring means to release said stopper means from said lifting means when the medium is inserted in the disk driving apparatus, and said return spring means returns said stopper means in contact with said lifting means when the inserted medium is ejected from the disk driving apparatus.

4. The disk driving apparatus according to claim 3, wherein said return spring means generates a force for ejecting the inserted medium out of the disk driving apparatus when said clamping means is released from said rotating means.

5. The disk driving apparatus according to claim 1, wherein said clamping means includes a collet for fixing the inserted medium on said rotating means, clamper pressure means for urging said collet in a direction away from said rotating means, and lever means for manually pushing said collet toward said rotating means in clamping of the inserted medium.

6. The disk driving apparatus according to claim 3, wherein said lifting means includes spring means for preventing said lifting means held by said head mutual contact-prevention means from being moved toward the medium with said clamping means, said spring means including an elastically deformable link spring disposed between said lifting means and said clamping means, said link spring deflecting to permit movement of said clamping means toward said rotating means without causing movement of said lifting means held by said head mutual contact-prevention means.

7. The disk driving apparatus according to claim 6, wherein said link spring is a leaf spring having a first end mounted on said lifting means and a second end contacting said clamping means.

8. A double-sided floppy disk driving apparatus, comprising:
   a. a base plate;
   b. a spindle;
   c. clamping means for clamping a floppy disk medium to said spindle, said clamping means including a clamper mounted on a clamper pressure plate, a manually operated lever, and a clamping mechanism linking said lever with said clamper pressure plate so that actuation of said lever lowers said clamper pressure plate and said clamper to clamp the medium between said clamper and said spindle;
   d. a pair of read/write heads for reading data from and writing data on the medium, said heads being movable toward and away from each other; and
   e. means, interlinked to said clamping means for controlling movement of said heads, said head control means including:
      head bias means for urging said heads to move toward each other;
      a paddle plate pivotally mounted on said base plate, said paddle plate having an opener portion at one end thereof abutting one of said heads, said paddle plate being biased against pivotting in a preselected clamping direction to overcome said head bias means and urge said one head to remain separated from the other of said heads;
      means for preventing mutual contact of said heads, said head mutual contact-prevention means including a paddle stopper plate pivotally mounted on said base plate adjacent said heads and a spring urging rotation of said paddle stopper plate to a preselected interfering position restricting movement of said paddle plate in said clamping direction, said paddle stopper plate also having a medium abutting portion abutting against the floppy disk medium when the medium is loaded in a loading direction, movement of the medium against said medium abutting portion causing said paddle stopper plate to rotate against said spring and out of said interfering position to permit movement of said paddle plate in said clamping direction; and
      linking means for linking movement of said paddle plate and said clamper pressure plate at times when said clamper pressure plate is lowered and said paddle stopper plate is out of said interferring position and for permitting relative movement between said clamper pressure plate and said paddle stopper plate at times when said clamper pressure plate is lowered and said paddle stopper plate is in said interfering position, the lowering of said clamper pressure plate pivoting said paddle plate in said clamping direction and releasing said opener portion from abutment with said one head to permit movement of said heads toward each other when movement of said paddle plate and said clamper pressure plate is linked.

9. An apparatus according to claim 8, wherein said medium abutting portion is abutted against the front edge of the loaded floppy disk medium.

10. An apparatus according to claim 8, wherein said medium abutting portion is abutted against the side edge of the loaded floppy disk medium.

11. An apparatus according to any one of claims 8 to 10, wherein said linking means includes an elastically deformable leaf spring having a first end mounted on said paddle plate and a second end contacting said clamper pressure plate.

* * * * *